Jan. 15, 1929.

W. LOUDEN ET AL

ANIMAL STALL

Filed July 29, 1926

INVENTORS
William Louden
Albert H. Neller

Patented Jan. 15, 1929.

1,699,333

UNITED STATES PATENT OFFICE.

WILLIAM LOUDEN AND ALBERT H. NELLER, OF FAIRFIELD, IOWA, ASSIGNORS TO THE LOUDEN MACHINERY COMPANY, OF FAIRFIELD, IOWA, A CORPORATION OF IOWA.

ANIMAL STALL.

Application filed July 29, 1926. Serial No. 125,719.

Our invention relates to the type of animal stalls generally used in dairy barns, and it consists first, of an improvement in the so-called top rail which holds the upper ends of the stall posts together; also of improved means for opening and closing the stanchion members which are used in the stalls, and of other improvements in the construction of the stalls which will be hereafter described and definitely set forth in the claims.

In the accompanying drawings forming a part of this specification.

Referring to the drawings, A represents stall posts having their lower ends set in a curb B, and their upper ends connected together by an improved form of what is generally known as the "top-rail," which consists of a pair of angle bars C, connected to the stall posts as will be hereafter described. Stanchions consisting of a pair of members D having their lower ends pivoted together and connected to the curb, preferably by chains E, are installed in the spaces between the adjacent posts, and their upper ends are supported and opened and closed as will be hereafter described. Stall partitions F having their lower ends set in a suitable foundation, not shown, and their upper ends connected to the stall posts by clamps G, are also preferably used to separate the adjoining stalls. At the left ends of Fig. 1 and 2 the lower ends of the partition members are broken away.

Figure 5:
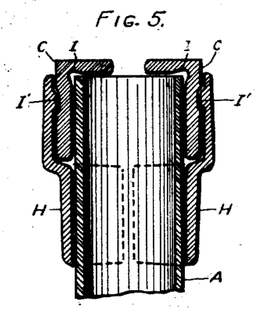
Fig. 5 is an enlarged transverse section on line 5—5 of Fig. 3.

The angle bars C, constituting the top-rail, have their upper flanges horizontally disposed with their edges inwardly disposed and are adapted to rest directly on the upper ends of the posts A, while their lower flanges are vertically disposed and are adapted to contact with the opposite sides of the posts adjoining their upper ends, as most plainly shown in Fig. 5. The bars are held in this position by pairs of clamping members H provided with bolts as shown in other figures, to draw them together and hold them in their clamping position. Heretofore, tubular members set upon the upper ends of the stall posts, have been generally used for the top-rails of animal stalls, and when angle bars have been used, they have also been set either bodily on the upper ends of the stall posts or altogether on their sides. The arrangement herein shown is advantageous in a number of ways. The posts can be set anywhere along the angle bars in constructing stalls of different widths without any drilling of holes or cutting of slots. The connections of the angles with the posts are more secure, the top-rail does not extend up so far above the ends of the posts, and it also provides more room and is better adapted to mechanism for simultaneously opening and closing the stanchion members, as will be later explained.

The angle bars C are also of an improved form. As usually made angle bars have fillets in the junction of their inner sides. These fillets are objectionable when connections of a rectangular form are brought into contact with their inner sides, for unless the contacting square corners are rounded off the fillets will prevent the sides, or sides and ends of the contacting members from coming into direct contact with the inner sides of the angles. If, to overcome this objection, the angles should be made without fillets in their inner corners, the sharp rib on the rolls which is necessary to produce the angular corners, will soon wear off and require frequent dressings of the rolls to keep them in order, and this is also objectionable.

Figure 6:
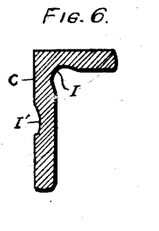
Fig. 6 is an enlarged detail section.

To overcome both of these objections, these angles are formed with an approximately semi-circular recess I, as most plainly shown in Fig. 6, which round recess is in reality a recessed fillet which is set back out of the way of rectangular connections, and which does not require a sharp easily worn rib on the rolls to form the angles, and at the same time, the recessed fillet is far enough back to permit a completely rectangular member to be brought into close contact with the inner sides of the angles. By this means, a perfect fit between the angle bars and the upper ends of the posts A is secured and without extra expense in rolling the angles, or of rounding off the corners of the upper ends of the posts. The flanges of the angles between the sides of the posts A and the clamping member H, have grooves I' rolled in their outer sides, and the members H have horizontally disposed ribs on their inner sides adapted to fit in said grooves, and to thereby prevent the angle bars from slipping out or being pushed out from between the clamping members and the posts.

The upper horizontally disposed flanges of the angle bars C are made narrower than the others, so that when placed upon stall posts of ordinary size, there will be a space between their inner edges, as most plainly shown in Fig. 5. The mechanism which supports the stanchion members D, and a part of what opens and closes them is mounted between these angle bars, and operates therein between the adjacent stall posts. One of the most essential parts of this mechanism in our invention is the sliding member J, which forms a support for the stanchion members. This sliding support is fitted on both sides of its upper edge with laterally extended flanges $J^1$ which ride on the adjacent horizontally disposed flanges of the angle bars C. It is also preferably fitted with flanges below the edges of these adjacent flanges of the angle bars, to hold it more evenly in place especially the flanges $J^1$, and the lower flanges $J^2$ which are extended on both sides close enough to the lower edges of the angle bars to hold the member evenly in place and prevents it from being sprung out of place by a sidewise thrust, as most plainly shown in Fig. 10.

The sliding member J is further fitted with downwardly extended portions $b$ and $d$, through which a bolt $e$ is passed. The upper ends of the stanchion member D have castings K riveted thereon, and the upper ends of these castings have some links of chain L connected to them. The upper links of the chains have the bolts $e$ passed through them, and by this means the stanchion members are supported by the sliding members J, which in turn, are supported by the angle bars C forming the top rail of the stalls. To hold the stanchion members from springing open when closed the portions $d$ of the sliding members J are extended still further downwards until they lap on the outer sides of the castings K which will effectually hold the stanchion members closed when the members J are locked in closed position, which will be later explained.

Figure 1:
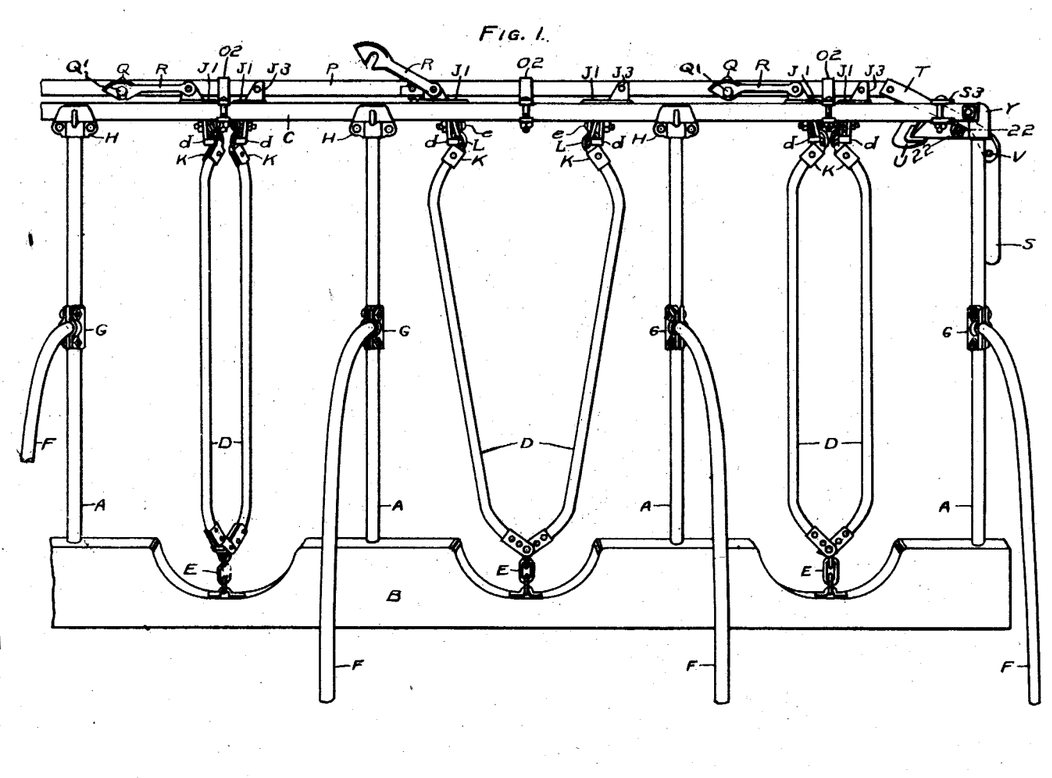
Fig. 1 is a perspective of a series of stalls embodying our invention.

The stanchion members being held in place both below and above by the chains E and L, will be free to swing around to accommodate the movements of the animal confined therein, as shown by the left hand stanchion in Fig. 1. To provide for this swinging movement of the stanchion, the extreme lower ends of the portions $d$ of the members J are extended laterally on both sides and are curved as shown in Figs 9, 11, 12, 13 and 14. By this means the stanchion members will be free to swing around to the necessary extent, and will still be securely held in closed position, other needed requirements, hereafter described, being observed. The sliding members J are arranged in pairs, one for each stanchion member—a co-acting pair for the complete stanchion. They are arranged to slide simultaneously in opposite directions so as to open and close the stanchion members by moving them simultaneously in opposite directions.

Figure 7:
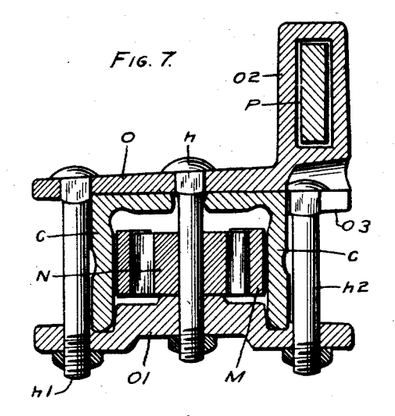
Fig. 7 is an enlarged vertically disposed transverse section on line 7—7 of Fig. 4, looking in the direction of the arrow.
Figure 12:
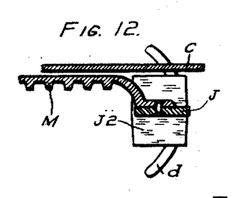
Fig. 12 is a horizontal section on line 12—12 of Fig. 8, looking in the direction of the arrow, the right hand end of Fig. 8 beyond the vertical line 10—10 not being shown.
Figure 13:
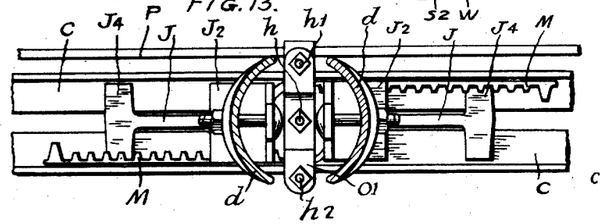
Fig. 13 is an enlarged view on line 13—13 of Fig. 3, looking upward, as designated by the arrow, the connections of the stanchion members being removed.
Figure 14:
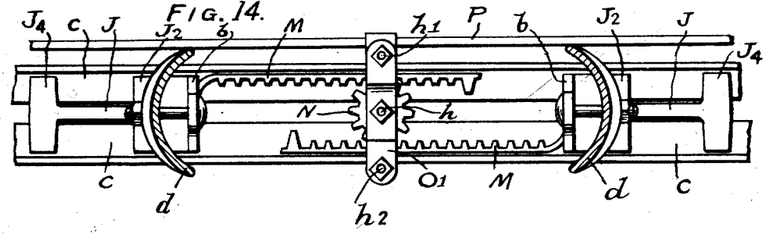
Fig. 14 is the same on line 14—14 of Fig. 4, the operating parts being drawn somewhat closer together than in Fig. 4.

Each member J is provided with a geared bar or rack M preferably made separate and connected to the member by a rivet, as most plainly shown in Fig. 12. The arrangement of the sliding members J and the geared racks M is most plainly shown in Figs. 13 and 14, which, as stated, are views from the under sides of Figs. 3 and 4. The parts shown in these figures occupy a central position between the adjacent stall posts A. The stanchion members D with their chain connections L and other outside attachments are taken off in Figs. 13 and 14 to give a better view of the other parts. Fig. 13 shows the sliding members J and geared racks M in the position they assume when the stanchion members are closed, and Fig. 14 shows the position they occupy when the members are open. As shown in these figures, the geared racks M are aligned on each side close to the lower vertically disposed flanges of the angle bars C. The gears on them are faced inward, and there is a space between them in which a small geared pinion N meshes in the geared racks, as most plainly shown in Figs. 7 and 14.

This geared pinion N is rotatably held in place by the bolt $h$ which is passed through upper and lower clamping members O and $O^1$, which are placed on the upper and lower edges of the angle bars C. To hold the clamping members O and $O^1$ more securely they may be extended laterally beyond the angle bars C, and additional bolt $h^1$ and $h^2$ may be passed through their extended ends, and by tightly turning up the nuts of these bolts the clamp will be held very securely in place. In addition to helping to hold the geared pinion in place, the upper clamp O may be utilized by forming at one end an upwardly extended guide $O^2$, for an elongated sliding bar P which performs a necessary function in opening and closing the stanchions. On the side under the guide $O^2$ it is preferable that forked lugs $O^3$ be extended out, and that the head of the bolt $h^2$ be slipped in between these lugs.

Figure 15:
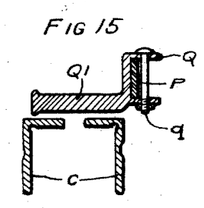
Fig. 15 is an enlarged vertically disposed transverse section on line 15—15 of Fig. 3, looking in the direction of the arrow, one of the operating parts being removed.
Figure 16:
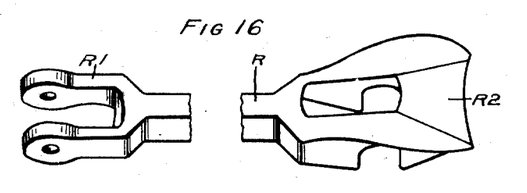
Fig. 16 is an enlarged detached detail.
Figure 19:
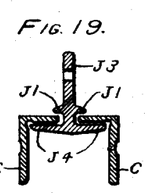
Fig. 19 is a vertically disposed transverse section on line 19—19 of Fig. 8, the part removed in Fig. 8 being replaced to make the structure complete.

At different points along the sliding bar P, it is fitted with clamping members Q, each of which are provided with a laterally extended latch pin $Q^1$, as most plainly shown in Fig. 15. A bolt $q$ is preferably used, as shown, to hold this clamp in place on the sliding bar P. As will be seen most plainly in Figs. 8, 9 and 19, the sliding members J are each provided with an upstanding lug $J^3$, having a centrally located hole therein. A latch bar R having a forked pivoting end $R^1$ and a latch end $R^2$ as most plainly shown detached in Fig. 16 but cut in two, is pivoted to one of the lugs $J^3$ of the pair of sliding members J which support the stanchion members in each of the stalls in the spaces between the posts A. When the latch end $R^2$ is connected to the latch pin $Q^1$, and the bar P is moved, it will move the sliding member J to which the latch R is pivoted. The geared rack M attached to this sliding member will then cause the geared pinion N to rotate, and this in turn will move in the opposite direction the geared rack attached to the other sliding member co-operating therewith. As the bar P is moved in opposite directions it will cause the coacting sliding members J supporting the adjacent stanchion members DD to move in opposite direction, and by this means, all the pairs of stanchion members thus connected to the sliding members J will be simultaneously opened and closed.

It will be observed that the upstanding lugs $J^3$ are inclined on one edge and vertically disposed on the other. Also, that they are centrally located on the outer ends of the sliding members J, and stand parallel with said members, their thickness being laterally while their width is longitudinally disposed. Also, that the latch members R have forked pivot ends $R^1$ adapted to lap on opposite sides of the lugs $J^3$ and be pivoted thereon, and the latch ends $R^2$, while in one position, are adapted to catch on the laterally disposed latch pins $Q^1$, but when turned over, upside down on their pivots, the latch ends have longitudinal slots which are adapted to catch on longitudinally disposed members, such as the upstanding lugs $J^3$. The advantages of this construction will be explained later on.

Figure 2:
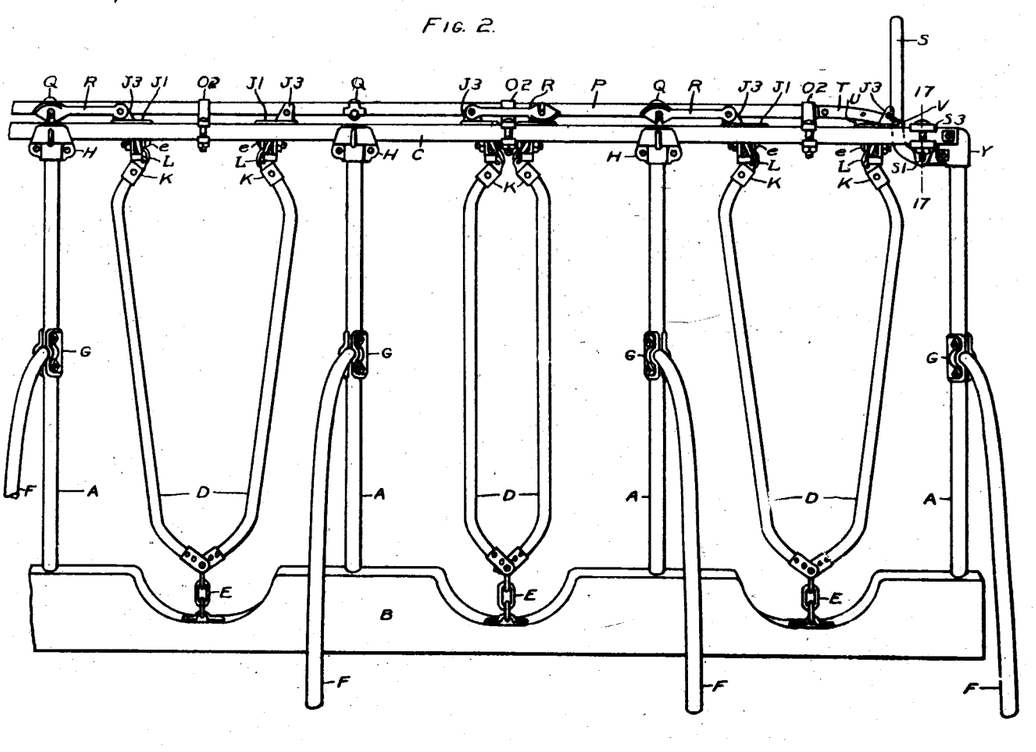
Fig. 2 is the same, the operating parts being in a different position.
Figures 3, 4:
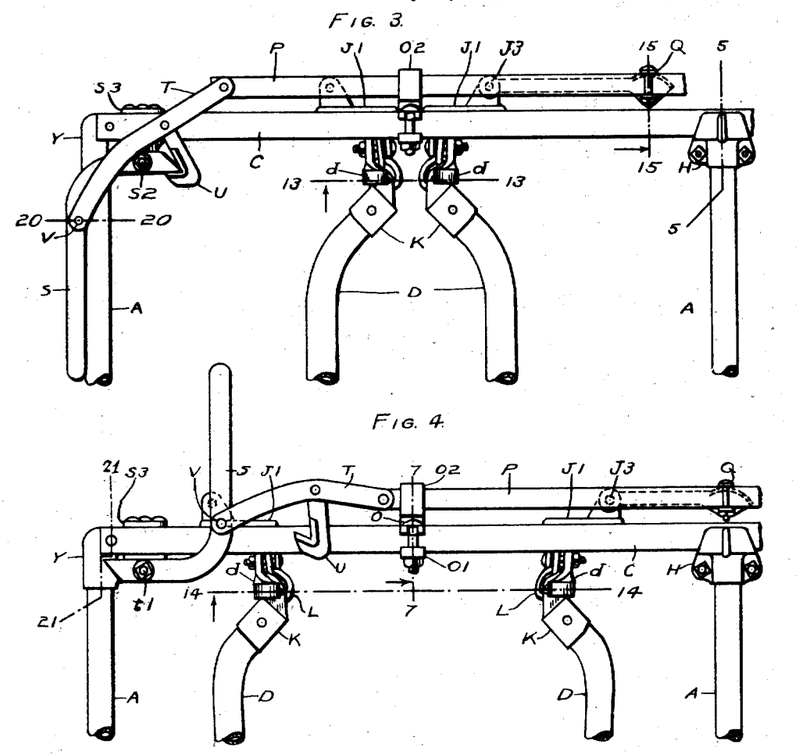
Fig. 3 is an enlarged perspective of the opposite side of the upper portion of the right hand end of Fig. 1.
Fig. 4 is the same of Fig. 2.

To impart movement to the sliding bar P, a lever S is used. It is pivoted to a casting $S^1$ secured to the angle bars C, at one end of the row of stalls as most plainly shown by Fig. 2, and is connected to the sliding bar P by links T. When the lever S is drawn down, as shown in Figs. 1 and 3, all the stanchion members attached to the pairs of sliding member J, having one of said members connected by the latch R to the latch pin $Q^1$ will be closed; and when the lever S is raised, as shown in Figs. 2 and 4, all of them will be open. When it is desired to have any of the stanchions remain open or closed and not be affected by the movement of the bar P, all that is necessary is to disconnect the latch R of that particular stall from its latch pin $Q^1$ on the bar P. Both Figs. 1 and 2 show instances of this kind. In Fig. 1 where the lever S is in lowered position to close the stanchion members the latch bar in the central stall is disconnected from the latch pin $Q^1$, and is shown standing above it. As a result, the stanchion in this stall remains open while the other two in the row are closed. On the other hand, in Fig. 2 the lever S is in raised position, and the stanchions in the end stalls, where the latch bars are connected with the latch pins $Q^1$ are open, while in the center stall where the latch bar is disconnected from its latch pin, the stanchion members remain closed. This arrangement is necessary when it is desirable to keep in or let out an animal independently of the others in the adjoining stalls.

Our invention also provides for holding the stanchion members locked in closed position. In Fig. 2 the stanchion members in the central stall are locked in closed position by disconnecting the latch R from the latch pin $Q^1$ and turning it over until the loop in its latch end $R^2$ will catch over the corresponding upwardly extended lug $J^3$, which it is adapted to do when the stanchion members are in closed position. In this case, the stanchion members will be held securely locked in closed position until the latch end of the latch bar is lifted from the adjacent lug $J^3$. As already explained, the construction of the latches R is such that the laterally disposed points on the latch ends $R^2$ will readily catch and hold on the laterally disposed latch pins $Q^1$, while the other end is pivoted to one of the upstanding lugs $J^3$, but when turned over its latch end will slide up the inclined edge of the upstanding lug $J^3$ on the other sliding member J of the set, and the longitudinal slot therein will pass over and catch on the outside vertical edge of the lug, whereby the stanchion members will be securely held in locked position. When the lever S is in lowered position, and all the stanchion members have the described connection with the sliding bar P, they will be held in locked position, because the pivots connecting the ends of the connecting links T to the lever S and the adjacent end of the sliding bar P will have passed below the central line of the pivot $S^2$ of the lever when it is in lowered position, as will be most plainly shown in Fig. 3.

Figure 20:
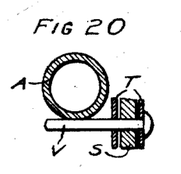
Fig. 20 is an enlarged horizontal section on line 20—20 of Fig. 3.

Also further, to hold the stanchion members more securely locked in closed position, we extend the reverse end of the lever S a short distance beyond its pivot $S^2$, and pivot a swinging locking dog U between the links T, so that a hook or catch on the lower end of the dog will catch under said extended end of the lever, and will prevent it from being raised until the dog is released. Furthermore, to prevent the lever from being moved too far in either direction, the end of the pivot member V which connects the links T to the lever S is extended out on the side next the angle bars C, and the stall post A, as shown by Fig. 20. By this arrangement the extended end of the pivot pin V will come in contact with the adjacent post A when the lever is down, and with the angle bars C when the lever is raised, and will prevent it from moving further in either direction, as shown in Figs. 1 and 2.

Figure 17:
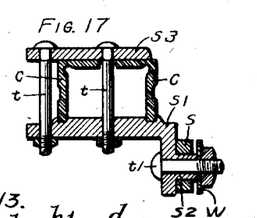
Fig. 17 is an enlarged vertically disposed transverse section on line 17—17 of Fig. 2.

The casting $S^1$ to which the lever S is pivoted is clamped on the angle bars C by means of the bolts $t$, of which there are preferably three, one at the side away from the lever and two between the angle bars C, but only one of the central bolts is shown in Fig. 17. A plate $S^3$ is placed on the upper edges of the angle bars through which the bolts $t$ are passed, as well as through the main casting $S^1$. This arrangement holds the pivot casting $S^1$ very firmly on the lower edges of the angle bars, and at the same time it permits an adjustment of the pivot casting back or forth along the angle bars to suit requirements of the operative parts. The casting $S^1$ is broadened on the side next the lever S and is extended downward, and on the downwardly extended portion the pivot part $S^2$ of the casting is located. As shown in Fig. 17 this part $S^2$ is made tubular, and through the opening a bolt $t^1$ is passed, with its nut on the outer side. A washer W large enough to hold the lever on the pivot arbor $S^2$ is placed on the bolt and is held there by the nut when it is turned down tightly on the bolt. It is desirable to have the lever pivoted in as low a position as possible, so that a short man or a little boy can operate it easily. Hence, the advantage of pivoting the lever below the top rail and also of using angle bars for the top rail, because they do not extend up as much above the stall posts as other forms of top rails.

Figure 18:
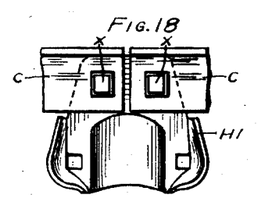
Fig. 18 is a detail.

When there are a series of half a dozen or more stalls in a row, it will be necessary to splice, or otherwise join together a number of angle bars. A preferred way to accomplish this, is to cut the bars so their ends will meet on certain of the stall posts. Then make perforations in the ends of the bars, preferably square, as shown in Fig. 18, which is an inside view of a special clamp member $H^1$ with the adjoining ends of adjacent angle bars C in place. Lugs X are formed on the contacting inner side of the clamp member $H^1$ to fit in the perforations in the ends of the angle bars C. This will join together the ends of the angle bars very securely and on the outside the appearance will be practically normal.

Figures 8, 10, 11, 21, 23:
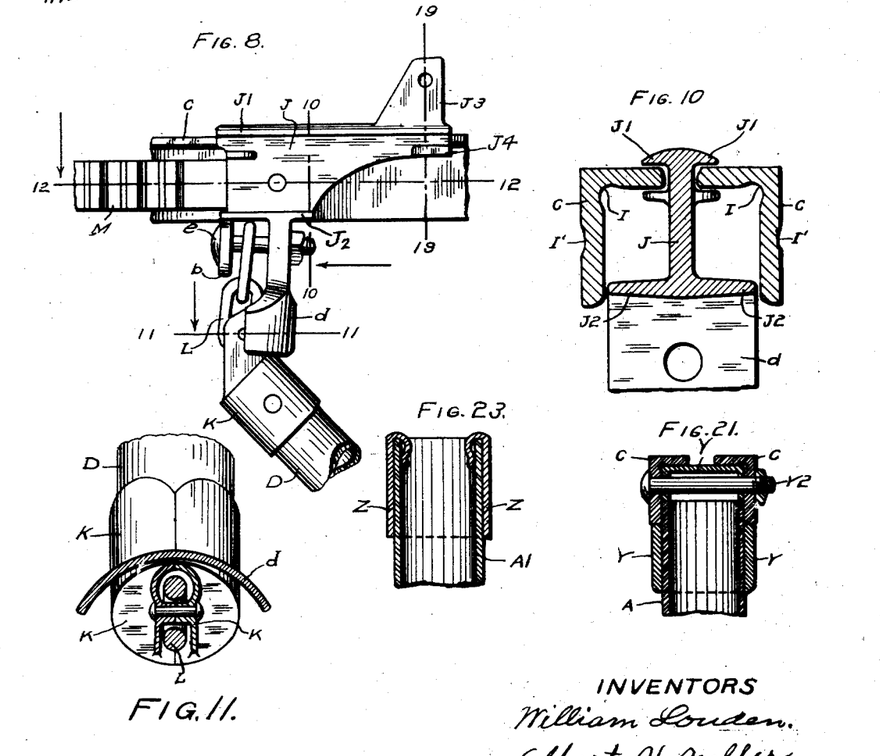
Fig. 8 is an enlarged side elevation of a portion of the mechanism which supports and opens and closes the stanchion members, the stall member on the near side to which this mechanism is connected being removed to give a better view of the mechanism.
Fig. 10 is an enlarged vertically disposed transverse section on line 10—10 of Fig. 8, looking in the direction of the arrow, the part removed in Fig. 8 being replaced to make the structure complete, and a bolt being removed.
Fig. 11 is an enlarged horizontally disposed section on line 11—11 of Fig. 8, looking in the direction of the arrow.
Fig. 21 is an enlarged vertically disposed transverse section on line 21—21 of Fig. 4.
Fig. 23 is an enlarged vertical section.
Figure 9:
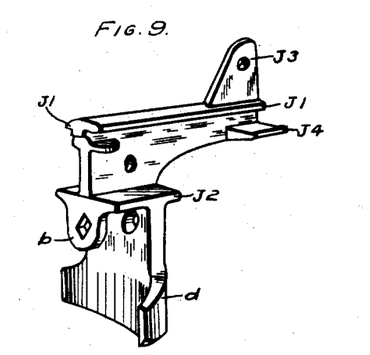
Fig. 9 is an enlarged detail perspective.
Figure 22:
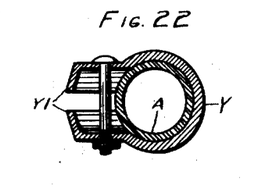
Fig. 22 is an enlarged section on line 22—22 of Fig. 1, the operating part in the rear being removed.

When angle bars are used for the top rail of animal stalls, a special arrangement has to be made for the elbow at the end of the row of stalls, or the corner coupling, as it is sometimes called. The upper ends of the stall posts come so close to the upper edge of the top rail that the ordinary rounded elbow couplings cannot be used. Figs. 1, 2 and 4 show a special coupling adapted to the situation, and Fig. 21 is an enlarged vertically disposed transverse section of the same on line 21—21 of Fig. 4. The corner coupling is preferably made of a casting Y to fit the stall post and is held thereon by two bolts, one of which is passed through lugs $Y^1$ on the inner side of the coupling, there being a space between the lugs so the bolt will draw the sides together as shown in Fig. 22. The other bolt $Y^2$, shown in Fig. 2, is passed through the holes in the ends of the angle bars, and also through holes in the upper ends of the casting Y which are recessed to receive the vertical flanges of the ends of the angle bars C, and permit their outer sides to be flush with the outsides of the casting Y. This makes a neat and substantial corner coupling and the pivot casting S¹ is permitted to come closer to the end post A than if an ordinary elbow coupling was used. In this construction the upper end of the end post has to be lowered a little to permit the passage of the bolt Y² above it to pass through the upper ends of the coupling members Y as well as through the ends of the angle bars C. It is not necessary to have this end post any shorter than the others, for it can be easily extended down that much further into the curb B or in the stall floor.

Occasionally a smaller stall post is used, along with the regular size, especially in some types of stalls having what is generally called side posts which are smaller than the others. To provide for this contingency, it being necessary that the angle bars should be continuously held a specified distance apart, we have devised clips Z, as shown in Fig. 23 which shows a short vertical section of a smaller tubular post A¹. The clips are to be made of metal of the necessary thickness to fill the space between the sides of the small post and the vertical flanges of the angle bars, and to thus have their outsides the necessary distance apart to hold the angle bars in their proper position. These clips can be made of narrow strips of pliable metal, and their upper end should be bent to fit tightly on the inner sides of the upper end of the tubing A¹ forming the smaller post. It is not advisable to use smaller posts when those of the proper size are available, but in case they are not available, these clips will make up for the deficiency.

This invention is complete in all respects. First the improved form of the top rail which provides a space between its lower vertically disposed flanges, the full widths of the posts for the movements of the operative parts mounted therein. Also, in the location of most of the operative parts between the angle bars forming the top rail, the method of supporting and operating the stanchion members, the arrangement for locking and otherwise controlling the operative parts, and in the details of construction generally. It is simple and compact in construction, is easily and expeditiously operated, and will fill a long felt want in the practical use of animal stalls.

What we claim and desire to secure by Letters Patent is as follows:—

1. In animal stalls, the combination of a series of vertically disposed spaced apart post arranged in a row and having their lower ends set in a suitable foundation, a pair of horizontally disposed right angle bars having their upper horizontal flanges spaced apart and placed on the upper ends of the posts, and their lower vertical flanges applied to the opposite sides of the posts adjoining their upper ends, means to hold the angle bars in contact with the posts, animal holding stanchions mounted in the spaces between the posts, and stanchion opening and closing means inserted in the continuous space between the angle bars, said opening and closing means being supported vertically by the upper horizontal flanges of the bars, and being held in place laterally by the lower portions of their vertical flanges.

2. In animal stalls the combination of a series of vertically disposed spaced apart posts arranged in a row and having their lower ends set in a suitable foundation, a pair of horizontally disposed angle bars having their upper flanges placed on the upper ends of the posts, and their lower flanges applied to the opposite sides of the posts adjoining their upper ends, and means to hold the angle bars in contacts with the posts, the angle bar having a set back rounded recess in its corner to permit its inner sides to come in direct contact with rectangular outlines of the posts.

3. In animal stalls, the combination of a series of vertically disposed spaced apart posts arranged in a row and having their lower ends set in a suitable foundation, a plurality of pairs of horizontally disposed angle bars having perforated ends, applied to the upper ends of the posts, and clamping members to hold the angle bars in contact with the posts, the abutting perforated ends of the angle bars meeting on some of the posts, and the clamping members applied to said posts having lugs adapted to enter said perforations, and to thereby prevent said abutting ends from being spread apart.

4. In animal stalls, the combination of a series of vertically disposed spaced apart posts arranged in a row and having their lower ends set in a suitable foundation, a pair of horizontally disposed angle bars having the adjacent ends of their upper flanges spaced apart and placed on the upper ends of the posts, and their lower vertical flanges applied to the opposite sides of the posts adjoining their upper ends and clamping members to hold the angle bars in contact with the posts, a groove being formed in each of the outer sides of the lower flanges of the angle bars, and the clamping members being provided with ribs on their adjacent sides to enter said groves and to thereby prevent the angle bars from being slipped out from between the clamping members and the posts.

5. In a device of the character described, the combination of a series of vertically disposed spaced apart posts arranged in a row and having their lower ends suitably supported, a pair of movable stanchion members installed in the spaces between the posts, a pair of continuous angle bars having their upper horizontal flanges placed on the upper ends of the posts and their vertical lower flanges applied to the opposite sides of the posts adjoining their upper ends, there being a space between the adjacent edges of said upper flanges, clamping means applied to the upper ends of the posts to hold the angle bars in contact therewith, a pair of sliding members mounted between the angle bars in the spaces between the adjacent posts, said members being adapted to slide simultaneously in opposite directions therein, and means for connecting each of the stanchion members to the adjacent sliding member, whereby the movement of the sliding members will open and close the stanchion members.

6. In a device of the character described, the combination of a series of vertically disposed spaced apart posts arranged in a row and having their lower ends suitably supported, a pair of movable stanchion members installed in the spaces between the posts, a pair of angle bars having their upper horizontal flanges placed on the upper ends of the posts and their lower vertical flanges applied to the opposite sides of the posts adjoining their upper ends, there being a space between the adjacent edges of said upper flanges, clamping means applied to the posts to hold the angle bars in contact therewith, a pair of sliding members mounted in the space between the angle bars in the spaces between the adjacent posts, and adapted to slide simultaneously in opposite directions and means for flexibly connecting each of the stanchion members to the adjacent sliding member, the sliding members being fitted with laterally extended projecting flanges to ride upon the upper horizontal flanges of the angle bars and to hold said sliding members in position thereon.

7. In a device of the character described, the combination of a series of spaced apart posts arranged in a row and having their lower ends suitably supported, a pair of movable stanchion members installed in the spaces between the posts, a pair of angle bars having their upper flanges placed on the upper ends of the posts and their lower flanges applied to the sides of the posts adjoining their upper ends, there being a space between the adjacent edges of said upper flanges, means to hold the angle bars in contact with the posts, a pair of sliding members mounted in the space between the angle bars and also between the adjacent posts, and adapted to slide simultaneously in opposite directions, and means for connecting each of the stanchion members to the adjacent sliding member, the sliding members being fitted with narrow laterally extended flanges to ride on the inner edges of the upper flanges of the angle bars, and with wide laterally extended flanges to bear against the inner lower edges of the vertical flanges of said bars to hold them more steadily in position thereon.

8. In a device of the character described, the combination of a series of upright spaced apart posts arranged in a row and having their lower ends suitably supported, a pair of movable stanchion members installed in each of the spaces between the posts, a pair of horizontally disposed spaced apart, angle bars connecting together the upper ends of the posts, a pair of sliding members in each of the spaces between the posts, mounted in the space between the angle bars and adapted to slide therein, links of chain connecting the upper ends of the stanchion members to the sliding members above them, means to move the adjacent sliding members simultaneously in opposite directions, whereby the stanchion members may be simultaneously opened or closed, and downwardly projecting portions on the sliding members adapted to contact with the upper ends of the stanchion members and prevent them from being opened when closed.

9. In a device of the character described, the combination of a series of upright spaced apart posts arranged in a row and having their lower ends suitably supported, a pair of movable stanchion members installed in each of the spaces between the posts, a pair of horizontally disposed spaced apart, angle bars connecting together the upper ends of the posts, a pair of sliding members in the spaces between the posts, mounted in the space between the angle bars and adapted to slide therein, links of chain connecting the upper ends of the stanchion members to the sliding members above them, means to move the adjacent sliding members simultaneously in opposite directions, whereby the stanchion members may be simultaneously opened or closed, and downwardly projecting portions on the sliding members adapted to contact with the upper ends of the stanchion members and prevent them from being opened when closed, said downwardly projecting portions of the sliding members being laterally semicircular at their lower ends, whereby the stanchion members may be swung around to an extent to correspond with the movements of the animal, and still be held in closed position by said downwardly extended semi-circular portions.

10. In a device of the character described, consisting of the combination of the spaced apart posts, the movable stanchion members in the spaces between the posts, angle bars connecting the upper ends of the posts together, the series of members to slide thereon, the upper ends of the stanchion members being connected to the respective sliding members by links of chains, in combination with separately constructed geared racks connected to the sliding members so as to overlap each other, the gears on the racks facing inward and having a space between them, upper and lower clamping members connected to the angle bars within the extensions of the adjacent sliding members, a geared pinion pivoted between said clamping members, and meshing into the adjacent geared racks, and means to move one of the series of sliding members in either direction, whereby the other sliding members will be moved in the opposite direction, and the stanchion members connected thereto will be alternately opened and closed.

11. In a device of the character described, consisting of the spaced apart posts, the movable stanchion members in the spaces between the posts, angle bars connecting the upper ends of the posts together, and the series of members to slide thereon, the upper ends of the stanchion members being connected to the respective sliding members by links of chains, in combination with separately constructed geared racks connected to the sliding members so as to overlap each other, the gears on the racks facing inward and having a space between them, upper and lower clamping members connected to the angle bars within the extensions of the adjacent sliding members, each of the upper clamping members having an upwardly extended looped portion, a horizontally disposed bar connected to one of the series of sliding members and adapted to slide in the looped portions of the upper clamping members, and means to move said bar in opposite directions, whereby said sliding members will be moved in opposite directions and the stanchion members connected thereto will be alternately opened and closed.

12. In a device of the character described, consisting of the combination of the spaced apart posts, the movable stanchion members in the spaces between the posts, angle bars connecting the upper ends of the posts together, and the series of members to slide thereon, the upper ends of the stanchion members being connected to the respective sliding members by links of chains, the geared racks connected to the sliding members, the upper and lower clamping members on the angle bars, the upper members being provided with upwardly extended loops, the geared pinions pivoted between the clamping members and meshing in the geared racks, the horizontally disposed slidable bar passed through said loops, in combination with latch members, each having a pivot end and a latch end, latch pins secured at intervals to the slidable bar, the pivot ends of the latch members being connected to one of the sliding members of each pair, and their latch ends being adapted to catch over the latch pins, and means to move the slidable bar in either direction, whereby the sliding members will be moved in opposite directions and the stanchion members connected thereto will be alternately opened and closed.

13. In a device of the character described, the combination of a series of suitably supported spaced apart vertically disposed posts having their upper ends connected by one or more pairs of continuous right angle bars adjustably clamped thereon, the upper horizontal flanges of said bars resting on the upper ends of the posts with a space between their inner edges, and their lower vertical flanges being clamped on opposite sides of the upper ends of the posts, sliding members arranged in cooperating pairs, and mounted between the flanges of said angle bars in the spaces between adjacent posts, said members each having a longitudinally disposed upstanding lug, stanchion members also arranged in pairs and connected to the adjacent pairs of sliding members, and means to move the pairs of sliding members simultaneously in opposite directions, said means consisting in part of an extended sliding bar having at intervals corresponding with the pairs of sliding members, laterally disposed latch pins, a latch member pivoted to one of each pairs of said longitudinally disposed upstanding lugs, and adapted to be connected with the adjacent laterally disposed latch pin attached to the sliding bar, whereby when the sliding bar is moved the movement will be communicated to the sliding members, means being connected to the sliding members whereby the movement of one member in one direction will simultaneously move the other member in the opposite direction, and the stanchion members connected thereto will be thereby simultaneously opened or closed, the latch end of the latch member besides being fitted to connect with the aforesaid laterally disposed latch pin, being also fitted when turned over on its pivot in the opposite direction, to be connected with the longitudinally disposed upstanding lug on the cooperating sliding member, whereby the sliding bar will be disconnected from the sliding member and the stanchion members connected thereto will be held in locked position, substantially as described.

14. In a device of the character described, the combination of a series of suitably supported spaced apart vertically disposed posts having their upper ends connected by one or more pairs of continuous angle bars adjustably clamped thereon, sliding members arranged in cooperating pairs, and mounted between the flanges of said angle bars in the spaces between adjacent posts, said members each having a longitudinally disposed upstanding lug, stanchion members also arranged in pairs and connected to the adjacent pairs of sliding members, and means to move the pairs of sliding members simultaneously in opposite directions, said means consisting in part of an extended sliding bar having at intervals corresponding with the pairs of sliding members, laterally disposed latch pins, a latch member pivoted to one of each pairs of said longitudinally disposed upstanding lugs, and adapted to be connected with the adjacent laterally disposed latch pin, attached to the sliding bar, whereby when the sliding bar is moved the movement will be communicated to the sliding members, means being connected to the sliding members whereby the movement of one member in one direction will simultaneously move the other member in the opposite direction, and the stanchion members connected thereto will be thereby simultaneously opened or closed, the upstanding lugs being inclined on their inner sides adjacent the opposite co-operating member, and vertically disposed on their outer sides, whereby when the latch end of the latch member is brought in contact with the co-operating lug it will slide up over the inclined side, and will catch and hold on the vertical side, and will thereby hold the sliding members and the stanchion members connected thereto, in locked position.

15. In animal stalls, the combination of a series of vertically disposed spaced apart posts having their lower ends suitably supported and their upper ends connected together by continuous horizontally disposed spaced apart members constituting a top rail, a pair of sliding members mounted in the spaces between the members comprising the top rail and in each of the spaces between the posts, stanchion members installed in the spaces between the posts and having their upper ends connected to the adjacent sliding members, a lever pivoted at one end of the row of stalls and having suitable connections with the sliding members to move them simultaneously in opposite directions, whereby the stanchion members may be simultaneously opened and closed, and a locking member adapted to automatically come in contact with an inner portion of the lever and to thereby automatically lock it and the stanchion members with which it is connected in closed position.

16. In animal stalls, the combination of a series of vertically disposed spaced apart posts having their lower ends suitably supported and their upper ends connected together by horizontally disposed spaced apart members constituting a continuous top rail, a pair of sliding members mounted in the spaces between the members comprising the top rail and in each of the spaces between the posts, stanchion members installed in the spaces between the posts and having their upper ends connected to the adjacent sliding members, and a lever connected to a pivot member adjustably clamped to the lower edge of the top rail close to the end post of the row of stalls, and having operable connection with the sliding members, whereby the pivot member may be longitudinally adjusted on the top rail, and the stanchion members connected thereto may be opened and closed and held in either of said positions by the up and down movements of the lever.

17. In animal stalls, the combination of a series of vertically disposed spaced apart posts having their lower ends suitably supported and their upper ends connected together by horizontally disposed members constituting a top rail, a pair of sliding members mounted on the top rail in each of the spaces between the posts, stanchion members installed in the spaces between the posts and having their upper ends connected to the adjacent sliding members, a slidable bar having operable connections with the sliding members, a lever pivoted at one end of the row of stalls and having its inner end extended beyond the pivot, links having one of their ends pivoted to a central part of the lever and the other ends pivoted to the adjacent end of the slidable bar, and a locking member having its upper end pivoted between the links and a hooked portion on its lower end adapted to automatically catch under the inwardly extended end of the lever when in closed position, and to hold the lever locked in said position.

18. In animal stalls, the combination of a series of vertically disposed spaced apart posts having their lower ends suitably supported and their upper ends connected together by horizontally disposed members constituting a top rail, a pair of sliding members mounted on the top rail in each of the spaces between the posts, stanchion members installed in the spaces between the posts and having their upper ends connected to the adjacent sliding members, a slidable bar having operable connections with the sliding members, a lever pivoted at one end of the row of stalls, links having pivot pins connecting one of their ends to a central part of the lever, and the other ends to the adjacent end of the slidable bar, one end of the pivot pin connecting the links to the lever being extended so as to come in contact with the end post when the lever is in lowered position and to come in contact with the top rail when the lever is in raised position, whereby the lever will be prevented from being moved too far in either direction.

19. In a device of the character described, the combination of a series of vertically disposed spaced apart posts having their lower ends suitably supported, a pair of horizontally disposed angle bars having their upper flanges placed on the upper ends of the posts and their lower flanges applied to the opposite sides of the posts at their upper ends, means to hold the portions of said angle bars in this kind of contact with the adjacent posts, and a corner coupling to hold the outer ends of said angle bars in contact with the end post, the lower flanges of the ends of the angle bars having perforations therein, the coupling being clamped around the upper end of the post, and having a recessed portion on opposite sides of its upper end, whereby the inner sides of the lower flanges of the angle bars will be permitted to stand flush with the adjacent sides of the upper ends of the end post, and the outer sides of the angle bars will be flush with the adjacent outer sides of the coupling, and a bolt passed through the perforation in the ends of the angle bars and through perforation in the recessed portion of the coupling above the upper end of the post, said bolt holding the ends of the angle bars in contact with the coupling which is secured to the upper end of the end post.

20. In animal stalls, the combination of a series of vertically disposed tubular posts set in a row and having their lower ends suitably supported, some of the posts being of a smaller diameter than the others, a pair of horizontally disposed right angle bars having their upper horizontal flanges placed on the upper ends of the posts the edges of said flanges being adjacent each other with a continuous space between them and their lower vertical flanges being applied to the opposite sides of the posts at their upper ends, means to hold the angle bars in contact with the posts, stanchion supporting means mounted in the continuous space between the angle bars and adapted to slide therein to open and close stanchion members, and a pair of clips applied to the opposite sides of the smaller posts in the spaces between them and said vertical flanges, whereby the angle bars will be held the same distance apart on the smaller as on the larger posts, the uniformity of the space between the angle bars being essential to the proper operation of the stanchion supporting means.

Fairfield, Iowa, July 26, 1926.

WILLIAM LOUDEN.
ALBERT H. NELLER.